United States Patent
Lee et al.

(10) Patent No.: US 11,463,185 B2
(45) Date of Patent: Oct. 4, 2022

(54) METHOD AND APPARATUS FOR COMMUNICATION ENVIRONMENT ANALYSIS AND NETWORK DESIGN CONSIDERING MOVABLE OBJECT

(71) Applicant: Samsung Electronics Co., Ltd., Suwon-si (KR)

(72) Inventors: Soonyoung Lee, Suwon-si (KR); Sungbum Park, Suwon-si (KR); Sanghyun Chang, Suwon-si (KR); Minsung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/772,932

(22) PCT Filed: Dec. 14, 2018

(86) PCT No.: PCT/KR2018/015899
§ 371 (c)(1),
(2) Date: Jun. 15, 2020

(87) PCT Pub. No.: WO2019/124879
PCT Pub. Date: Jun. 27, 2019

(65) Prior Publication Data
US 2021/0167878 A1 Jun. 3, 2021

(30) Foreign Application Priority Data
Dec. 18, 2017 (KR) .................. 10-2017-0174308

(51) Int. Cl.
*H04B 17/391* (2015.01)
*H04B 17/27* (2015.01)
*H04B 17/309* (2015.01)

(52) U.S. Cl.
CPC ........... *H04B 17/391* (2015.01); *H04B 17/27* (2015.01); *H04B 17/309* (2015.01)

(58) Field of Classification Search
CPC ..... H04B 17/391; H04B 17/27; H04B 17/309
See application file for complete search history.

(56) References Cited

U.S. PATENT DOCUMENTS

| | | | | |
|---|---|---|---|---|
| 4,939,522 A | * | 7/1990 | Newstead | G01S 1/56 342/387 |
| 6,862,524 B1 | | 3/2005 | Nagda et al. | |

(Continued)

FOREIGN PATENT DOCUMENTS

| | | |
|---|---|---|
| CN | 103609044 A | 2/2014 |
| CN | 105519171 A | 4/2016 |

(Continued)

OTHER PUBLICATIONS

European Search Report dated Oct. 27, 2020, issued in European Application No. 18892570.5.

(Continued)

*Primary Examiner* — Duc C Ho
(74) *Attorney, Agent, or Firm* — Jefferson IP Law, LLP

(57) ABSTRACT

A communication technique for combining a fifth generation (5G) communication system with Internet of Things (IoT) technology for supporting a higher data transmission rate than a fourth generation (4G) system, and a system thereof, are provided. A method for identifying a transmission characteristic of a radio signal in a wireless communication system according to one embodiment of the present disclosure comprises the steps of: identifying a signal transmission position; identifying a signal reception position; identifying an area in which a movable object is located between the signal transmission position and the signal reception position; identifying a characteristic of the movable object in the area; and identifying a transmission characteristic of a radio (Continued)

signal transmitted from the signal transmission position to the signal reception position based on the characteristic of the movable object.

14 Claims, 17 Drawing Sheets

(56) References Cited

U.S. PATENT DOCUMENTS

| | | |
|---|---|---|
| 9,557,183 B1 | 1/2017 | Ross et al. |
| 2011/0281526 A1 | 11/2011 | Matsuda et al. |
| 2013/0005285 A1 | 1/2013 | Yin |
| 2014/0114635 A1 | 4/2014 | Sato et al. |
| 2014/0257779 A1 | 9/2014 | Yoon et al. |
| 2014/0336848 A1 | 11/2014 | Saund et al. |
| 2015/0138017 A1 | 5/2015 | Jo et al. |
| 2015/0215892 A1* | 7/2015 | Teng ............... G01S 5/0226 455/456.1 |
| 2016/0205667 A1 | 7/2016 | Shen et al. |
| 2017/0180062 A1* | 6/2017 | Johansen ............ H04W 76/27 |
| 2018/0156888 A1* | 6/2018 | Moshfeghi ........... G01S 5/0252 |

FOREIGN PATENT DOCUMENTS

| | | |
|---|---|---|
| KR | 10-1076864 B1 | 10/2011 |
| KR | 10-2014-0109658 A | 9/2014 |
| KR | 10-2015-0057628 A | 5/2015 |
| KR | 10-2018-0055623 A | 5/2018 |
| WO | 1998/04059 A1 | 1/1998 |
| WO | 2012/113132 A1 | 8/2012 |

OTHER PUBLICATIONS

Lee et al., "A study on channel modeling of 5.9 GHz band communication based on Ray tracing", Korean Society of Marine Engineering, vol. 41, No. 9 pp. 921-927, 2017.

Korean Office Action dated Nov. 12, 2021, issued in Korean Application No. 10-2017-0174308.

2015 IEEE 26th Annual International Symposium on Personal, Indoor, and Mobile Radio Communications (PIMRC), Dong et al., "Simulation Study on Millimeter Wave 3DBeamforming, Systems in Urban Outdoor Multi-cell Scenarios Using 3D Ray Tracing" Dec. 3, 2015.

IEEE Antennas and Propagation Society International Symposium, 1996 Digest, Jan et al., "A Propagation Modeling for Microcellular Communications in Urban Environments with Vehicles and Trees" Aug. 6, 2002.

China Master's Theses Full-text Database (Collections of Information Technologies), Song, "Study on the Propagation Characteristics of Mobile Communication Radio Waves in Tunnels Based on the Method of SBR/Image" May 15, 2015.

Chinese Office Action dated Mar. 8, 2022, issued in Chinese Application No. 201880076710.9.

* cited by examiner

FIG. 6
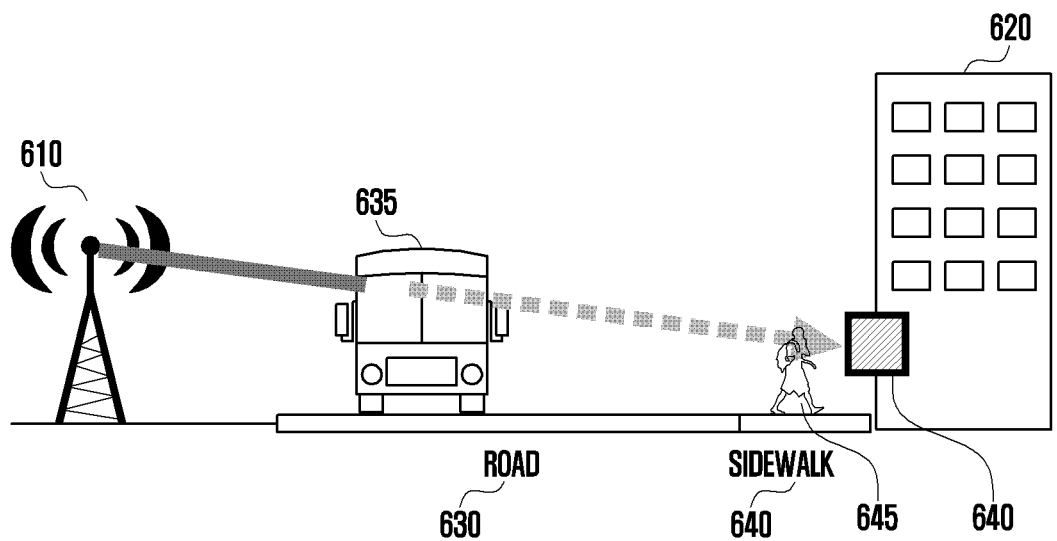
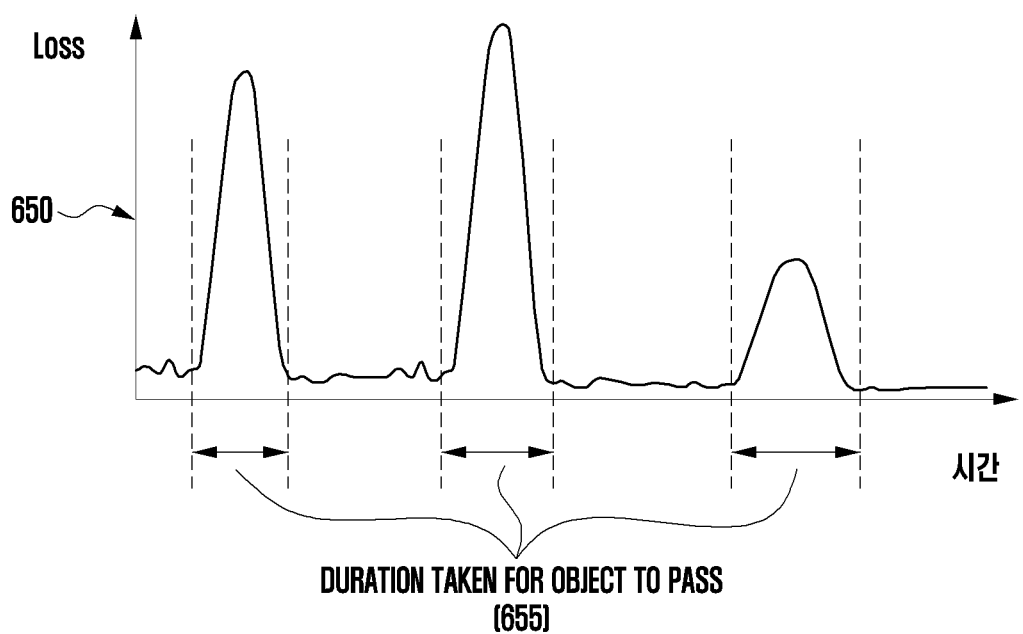

FIG. 13
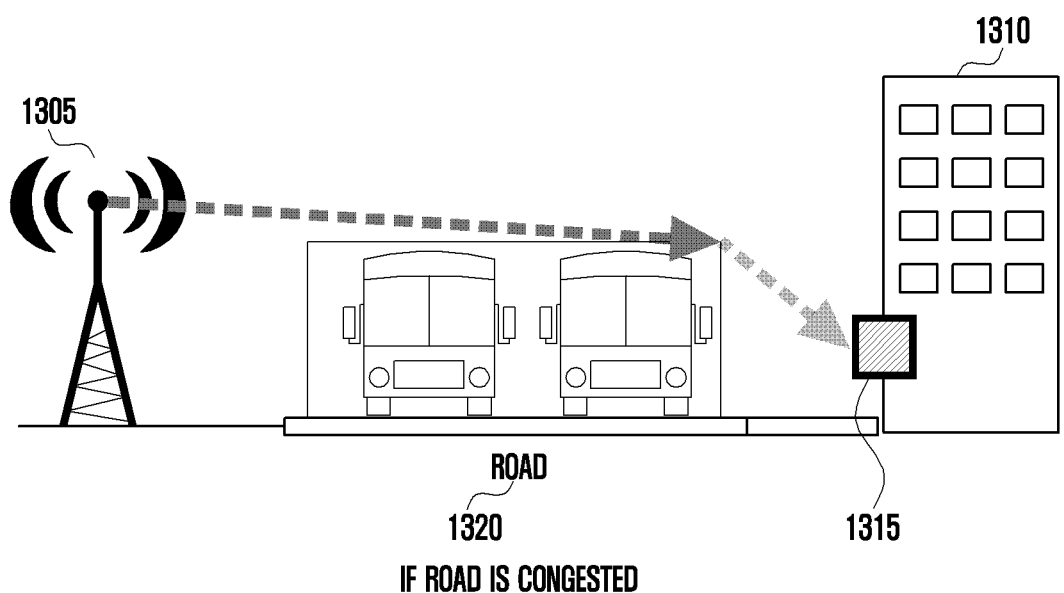
IF ROAD IS CONGESTED
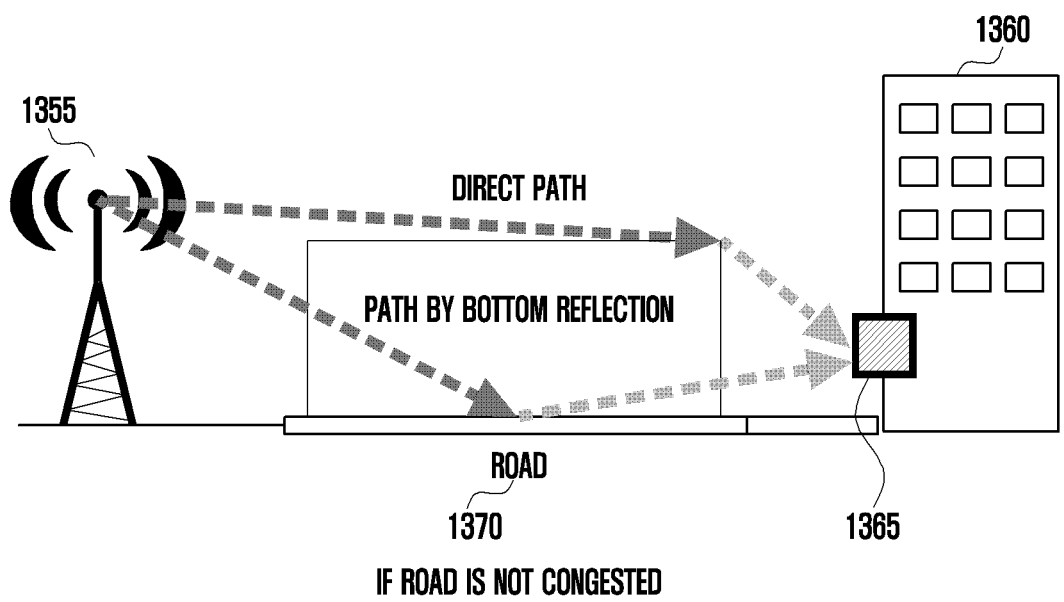
IF ROAD IS NOT CONGESTED

METHOD AND APPARATUS FOR COMMUNICATION ENVIRONMENT ANALYSIS AND NETWORK DESIGN CONSIDERING MOVABLE OBJECT

CROSS-REFERENCE TO RELATED APPLICATION(S)

This application is a U.S. National Stage application under 35 U.S.C. § 371 of an International application number PCT/KR2018/015899, filed on Dec. 14, 2018, which is based on and claims priority of a Korean patent application number 10-2017-0174308, filed on Dec. 18, 2017, in the Korean Intellectual Property Office, the disclosure of each of which is incorporated by reference herein in its entirety.

TECHNICAL FIELD

Embodiments of the disclosure relate to a method for modeling a frequency communication environment for operating a wireless communication system and for operating a network, based thereon, and an apparatus using the same. More specifically, embodiments of the disclosure are intended to provide a method for network operation and an apparatus using the same by analyzing a radio signal propagation characteristic of a corresponding area in consideration of a moving path and a moving characteristic of a movable object in a wireless communication environment using mmWave and modeling a communication environment based thereon.

BACKGROUND ART

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the case of recent communication systems, since a relatively high-frequency communication signal is used, it is necessary to analyze a wireless communication environment in consideration of movable objects, configure a network based thereon, and operate the installed network.

DISCLOSURE OF INVENTION

Technical Problem

Embodiments of the disclosure have been made to solve the above-mentioned problems, and are intended to provide a method for operating a wireless communication system using the wireless communication environment modeling for operating a wireless communication system in consideration of a movable object and an apparatus using the same. In addition, embodiments of the disclosure are intended to provide a method and apparatus for analyzing and modeling a radio signal propagation characteristic in consideration of an area in which a radio signal transmitted from a transmitter and a movable object are located in a communication system using a radio signal, based on the same.

Solution to Problem

In order to solve the technical problem, a method for identifying a transmission characteristic of a radio signal in a wireless communication system according to an embodiment of the disclosure includes: identifying a signal transmission position; identifying a signal reception position; identifying an area in which a movable object is located between the signal transmission position and the signal reception position; identifying a characteristic of the movable object in the area; and identifying a transmission characteristic of a radio signal transmitted from the signal transmission position to the signal reception position, based on the characteristic of the movable object.

A computing device for identifying a transmission characteristic of a radio signal in a wireless communication system according to another embodiment of the disclosure includes: a transceiver configured to transmit and receive information; and a controller configured to be connected to the transceiver, identify a signal transmission position, identify a signal reception position, identify an area in which a movable object is located between the signal transmission position and the signal reception position, identify the characteristics of the movable object in the area, and identify a transmission characteristic of a radio signal transmitted from the signal transmission position to the signal reception position based on the characteristics of the movable object.

Advantageous Effects of Invention

According to the embodiments of the disclosure, it is possible to identify the propagation characteristics of a radio signal in a wireless communication system and to perform more accurate system modeling and more efficient network operation.

BRIEF DESCRIPTION OF DRAWINGS

FIG. 6 is a view for explaining the effect of a movable object on the radio signal transmission and the resulting signal loss according to an embodiment of the disclosure;

FIG. 13 is a view for explaining a method for determining a propagation characteristic of a signal, based on the congestion degree of each movable object according to an embodiment of the disclosure;

MODE FOR THE INVENTION

Figure 1:
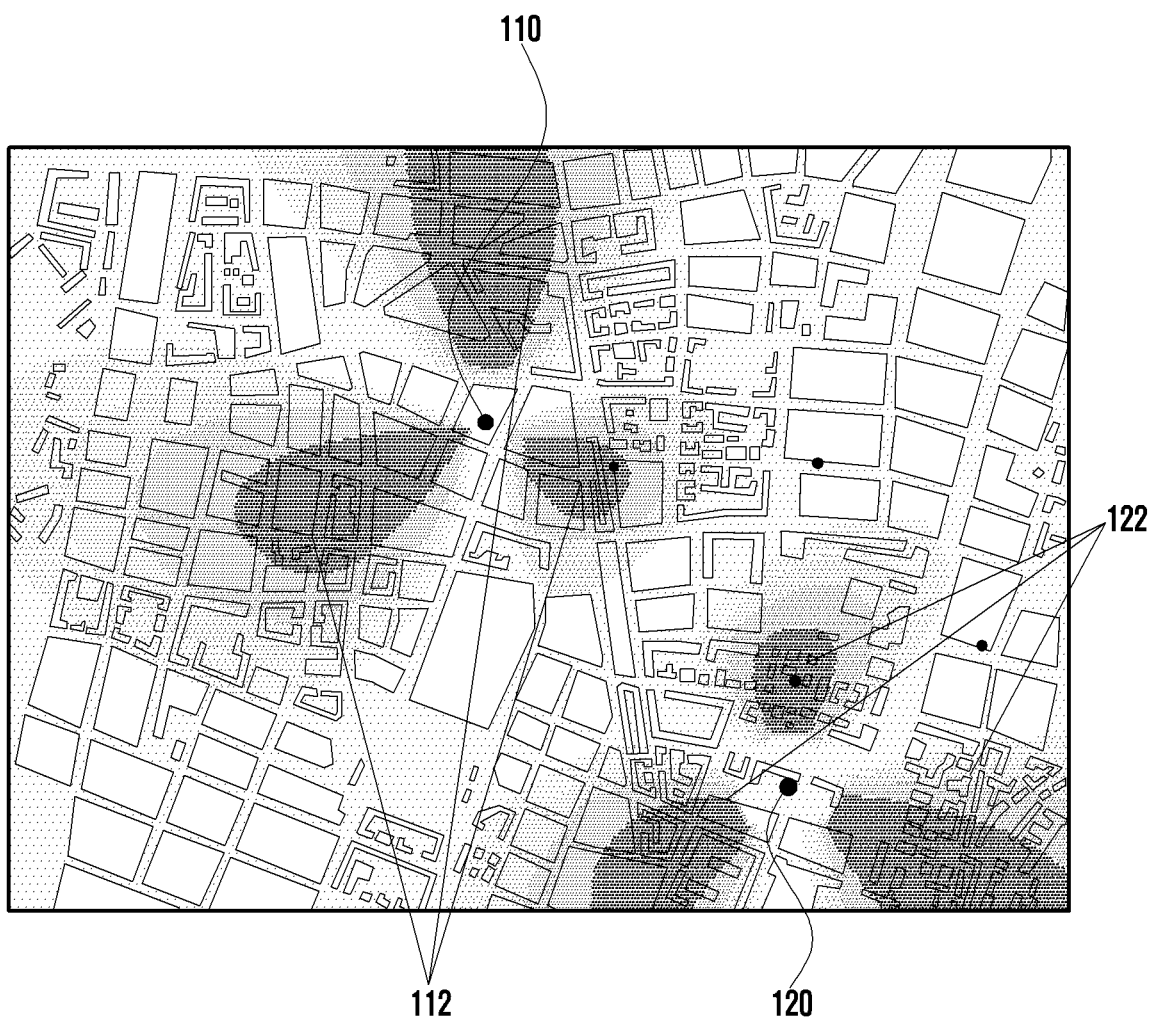
FIG. 1 is a view for explaining a network design using a mathematical modeling technique.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card.

In the drawings in which methods according to the embodiments are described, the order of the description does not always correspond to the order in which steps of each method are performed, and the order relationship between the steps may be changed or the steps may be performed in parallel. Further, it will be apparent that steps not mentioned as necessary in the embodiments may be selectively performed.

FIG. 1 is a view for explaining a network design using a mathematical modeling technique.

Referring to FIG. 1, transmitters 110 and 120 may form transmission beams 112 and 122, respectively, to transmit signals.

As such, the mathematical modeling technique can predict radio frequency (RF) information via a function explicitly expressed via a specific signal transmission/reception modeling technique by inputting the frequency and distance of a transmission signal. As shown in FIG. 1, the transmitters 110 and 120 may form beams 112 and 122 in three directions, respectively, and accordingly, the RF characteristics of a transmission signal may be applied via the modeling technique. As such, via the mathematical modeling technique, RF information can be predicted with a smaller amount of calculations, but a method for accurate measurement at a higher frequency is required.

Figure 2:
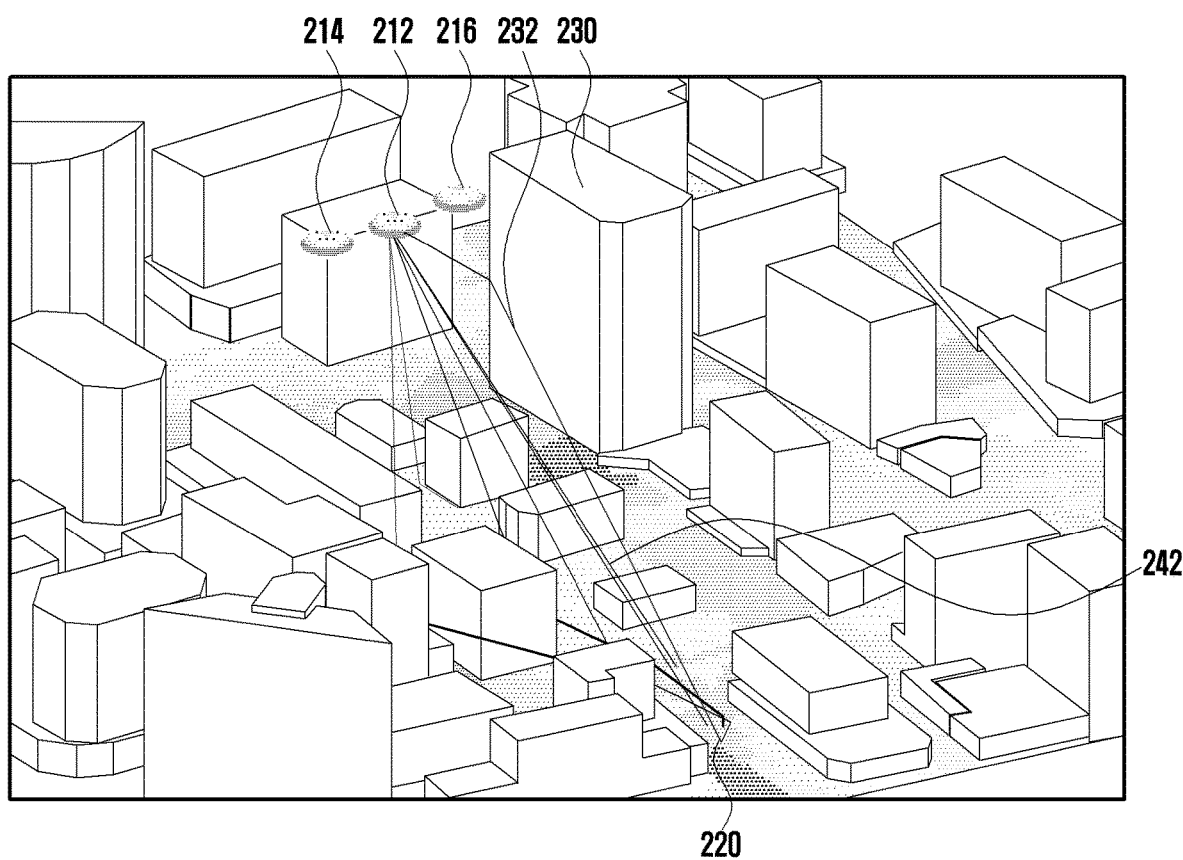
FIG. 2 is a view for explaining a ray-tracing simulation method according to an embodiment of the disclosure.

FIG. 2 is a view for explaining a ray-tracing simulation method according to an embodiment of the disclosure.

Referring to FIG. 2, it is assumed that one or more transmitters 212, 214 and 216 transmit signals, and accordingly, the strength at which signals transmitted by each transmitter 212, 214 and 216 are received is indicated by shades of gray on the map. The darker color is a region having a strong reception strength, and the lighter color is a region having a weaker signal strength.

More specifically, assuming the location of the receiver 220, it is possible to determine the reception strength of the signal in the corresponding areas. In addition, it is possible to determine a transmission channel for each possible path from one transmitter 212 to the receiver 220. There may be a signal 242 transmitted directly from the transmitter 212 to the receiver 220, and there may also be a signal 232 received by being reflected by another object 230. When the simulation according to ray tracing is performed as described above, it is possible to obtain information on the strengths of signals received from the transmitters 212, 214 and 216 in a specific area and the transmission path of the corresponding signal. When determining the signal reception strength according to the transmission path of the signal, in the case in which at least one of the surface material and the external shape of the reflected object is taken into consideration, the receiver 220 can obtain more accurate signal reception information. Although referred to as a surface material in the embodiment, this does not mean only the outer surface of the object, and conceptually includes an inner material that can affect the reflection of radio waves and can estimate the characteristics of radio wave reflections more accurately via such information.

Also, an obstacle capable of transmitting radio waves may be located on a path through which a signal is directly transmitted. As an example of such an obstacle, there may be a tree, and an obstacle in which signal attenuation may occur while transmitting radio waves in addition to the tree may be considered in the ray-tracing simulation. In this way, more accurate simulation results can be obtained by considering information about obstacles capable of transmitting radio waves. The tree may be another plant or an object installed on a communication path as an example of an obstacle that is located on the communication path and causes signal attenuation when transmitting radio waves, and may include other objects that may cause signal attenuation.

As such, it is possible to determine at least one of an optimal transmitter location and a receiver location on a map by performing ray tracing as described above. Also, according to an embodiment, the ray-tracing simulation may be performed in consideration of a plurality of transmitter location candidates and receiver location candidates, and at least one of a transmitter location and a receiver location may be determined according to the result of ray tracing.

As described above, the ray-tracing simulation technique can determine a transmission channel for each path through which the RF signal passes, and can predict RF signal information at the location of the receiver 220 based on the transmission channel. In an embodiment, the ray-tracing simulation technique calculates at least one of the environment of the path (e.g., type of medium), three dimensional (3D) terrain, and reflection and diffraction by buildings, as well as the distance that the signal is transmitted, in the process of determining the channel environment according to the signal path, thereby more accurately predicting RF signal information. In addition, the channel estimation method using the above technique has no limitation according to the frequency of the RF signal and can accurately reflect the actual environment, and can determine at least one of an optimal transmission location and a reception location, based on the simulation result.

In addition, the 5G network uses an ultra-high frequency signal of 28 to 60 GHz. Therefore, in order to find information on a radio signal in a 5G network design tool, it is possible to increase accuracy using a ray-tracing simulation technique rather than a mathematical modeling technique. In an example of ray-tracing simulation, when predicting the path where a radio wave strikes a building and is reflected, reflections can be calculated assuming that the surfaces of all buildings have the same RF property. However, since the reflectance of the RF signal varies depending on the surface material, external shape, and pattern of the reflective surface, this assumption does not guarantee an accurate simulation result.

Figure 3A:
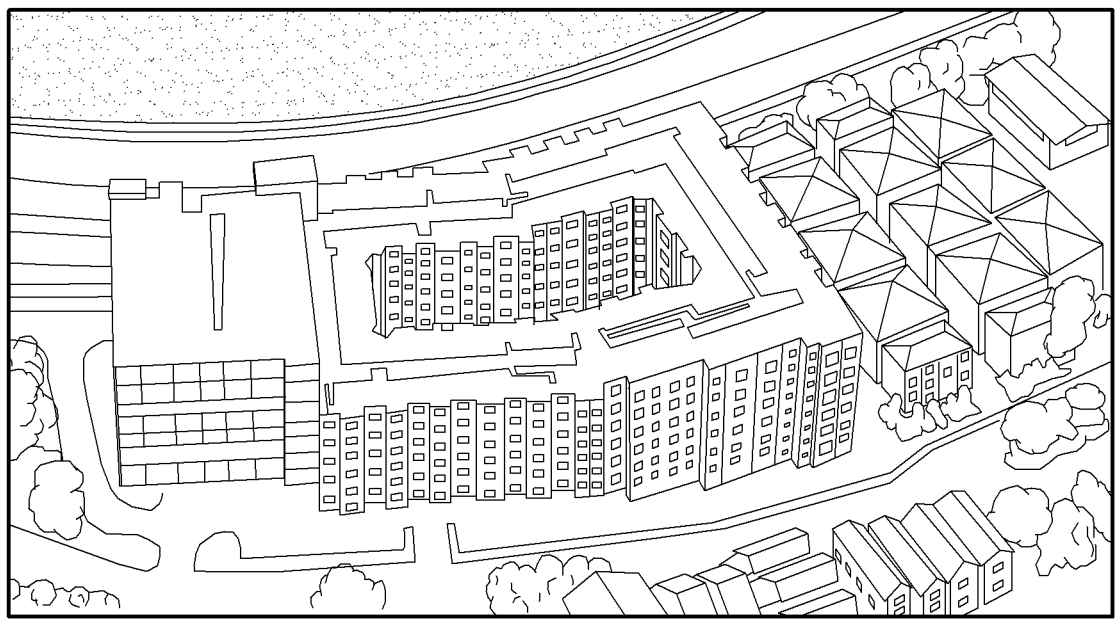
FIGS. 3A and 3B are views for explaining a method for obtaining three dimensional (3D) map information according to an embodiment of the disclosure.
Figure 3B:
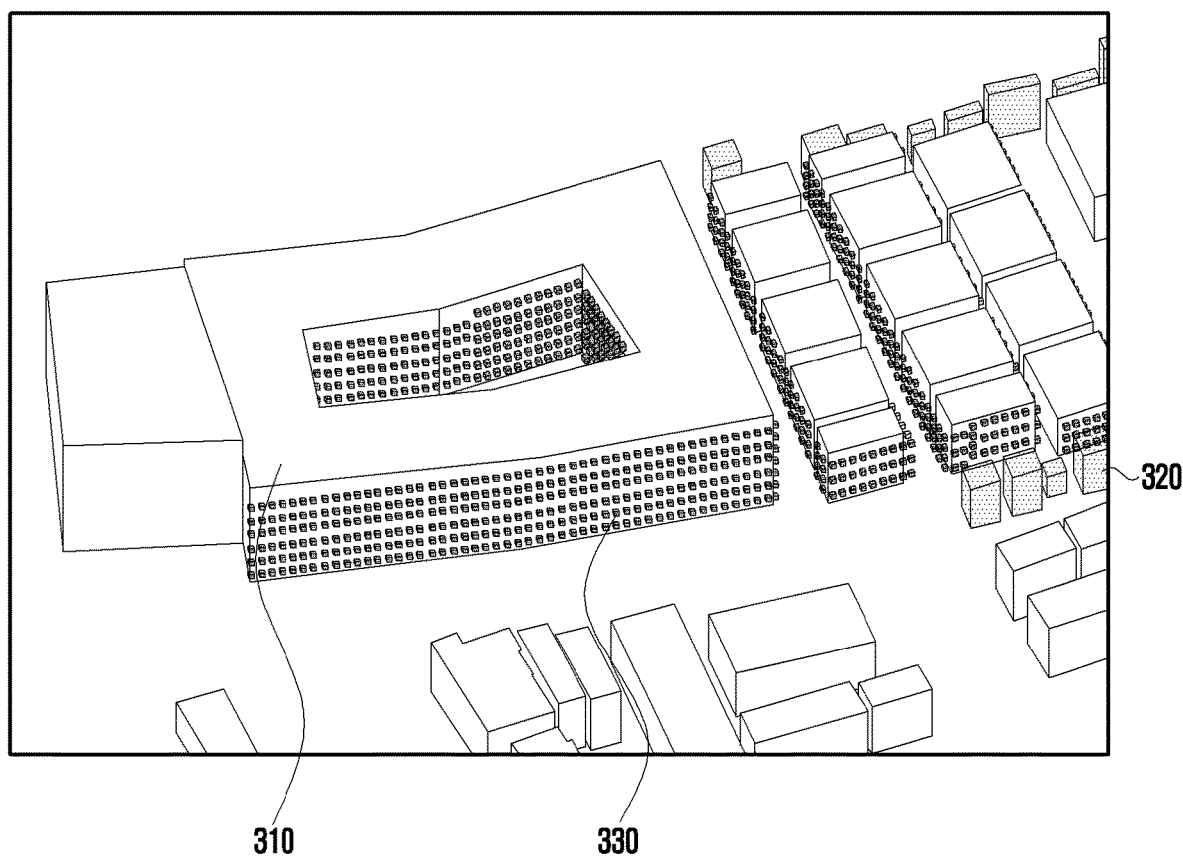

FIGS. 3A and 3B are views for explaining a method for obtaining 3D map information according to an embodiment of the disclosure.

Referring to FIGS. 3A and 3B, three-dimensional map information can be obtained based on actual image information of FIG. 3A and location information corresponding to the image information. More specifically, the 3D map information of FIG. 3B may be obtained to perform a ray-tracing simulation, based on the image information.

The map information obtained in FIG. 3B may include a building 310, a receiver candidate region 330 and a tree 320. As described above, by obtaining the map information, a transmitter location candidate and a receiver location candidate may be determined based on the map information, and accordingly, ray-tracing simulation may be performed to determine at least one of an optimal transmitter location and a receiver location.

In addition, in the embodiment, elements such as the building 310 may have a characteristic of reflecting or scattering radio waves, and in the case of such elements, more accurate simulation results can be obtained by considering surface materials and external shapes.

Also, in the embodiment, the tree 320 may transmit radio waves, but the transmitted radio waves may experience greater signal attenuation than in the air. In this way, more accurate simulation results can be obtained by considering propagation characteristics through an object such as a tree 320.

Also, in the embodiment, the receiver candidate region 330 may be selectively performed according to ray tracing, and may include a region in which a fixed or movable receiver can be installed. More specifically, a receiver may be installed in the window area of the building 310, and through this, the receiver installed in the window area may perform a relay role in communication between another receiver inside the building and a transmitter outside the building. As described above, a ray-tracing simulation may be performed in consideration of the receiver candidate region 330 in order to obtain a result value in consideration of a better signal reception environment.

Figure 4A:
FIGS. 4A and 4B are views for explaining a method of obtaining material information of an object in an image via image information according to an embodiment of the disclosure.
Figure 4B:
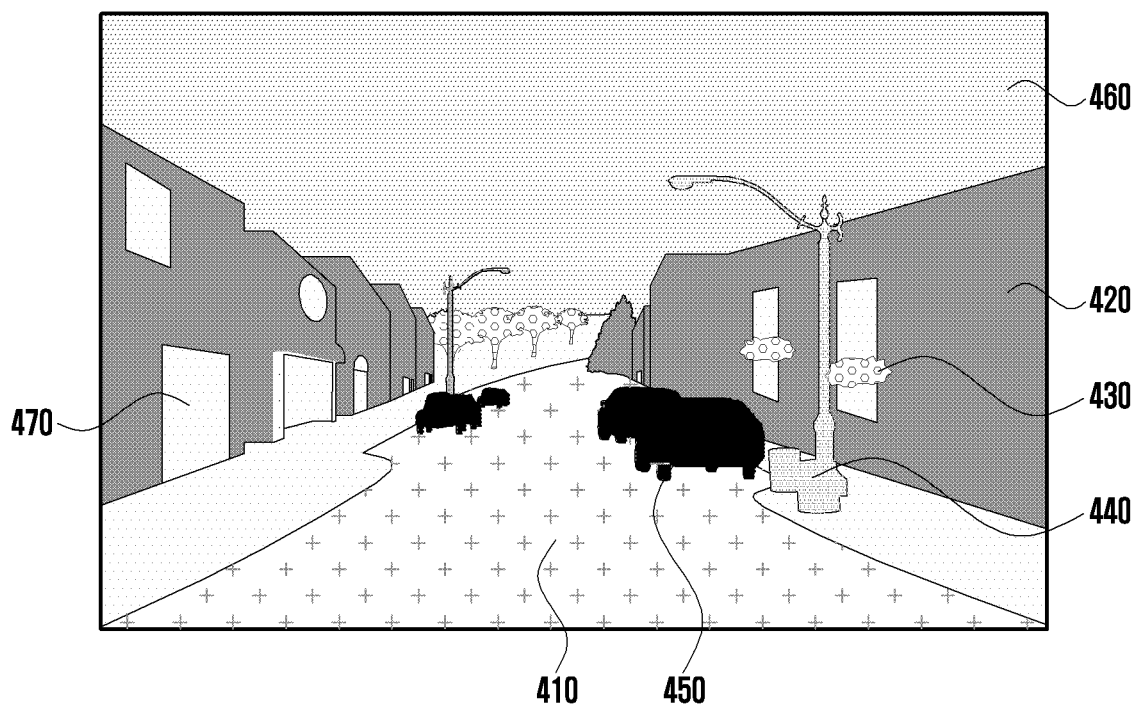

FIGS. 4A and 4B are views for explaining a method for obtaining material information of an object in an image via image information according to an embodiment of the disclosure.

Referring to FIGS. 4A and 4B, from the image information, it is possible to determine the material of the object displayed inside the image. More specifically, from the image information, it is possible to determine the material of an object inside the image based on deep-learning-based computer vision technology. Features related to more specific deep-learning-based computer vision technologies will be described later.

In an embodiment, the image information of FIG. 4A may be analyzed to obtain the result of FIG. 4B. At this time, each element may be determined based on at least one of color, contrast, reflectivity, the mutual positional relationship between each element, and the arrangement of all components of the image. In an embodiment, materials of asphalt 410, concrete 420, plants 430, steel structures 440, vehicles 450, the sky 460, glass 470, and the like may be determined through image analysis. As described above, it is possible to obtain a more accurate result by determining the material of elements displayed in the image via the image information and taking into consideration the characteristics of the material in the ray-tracing simulation.

Figure 5:
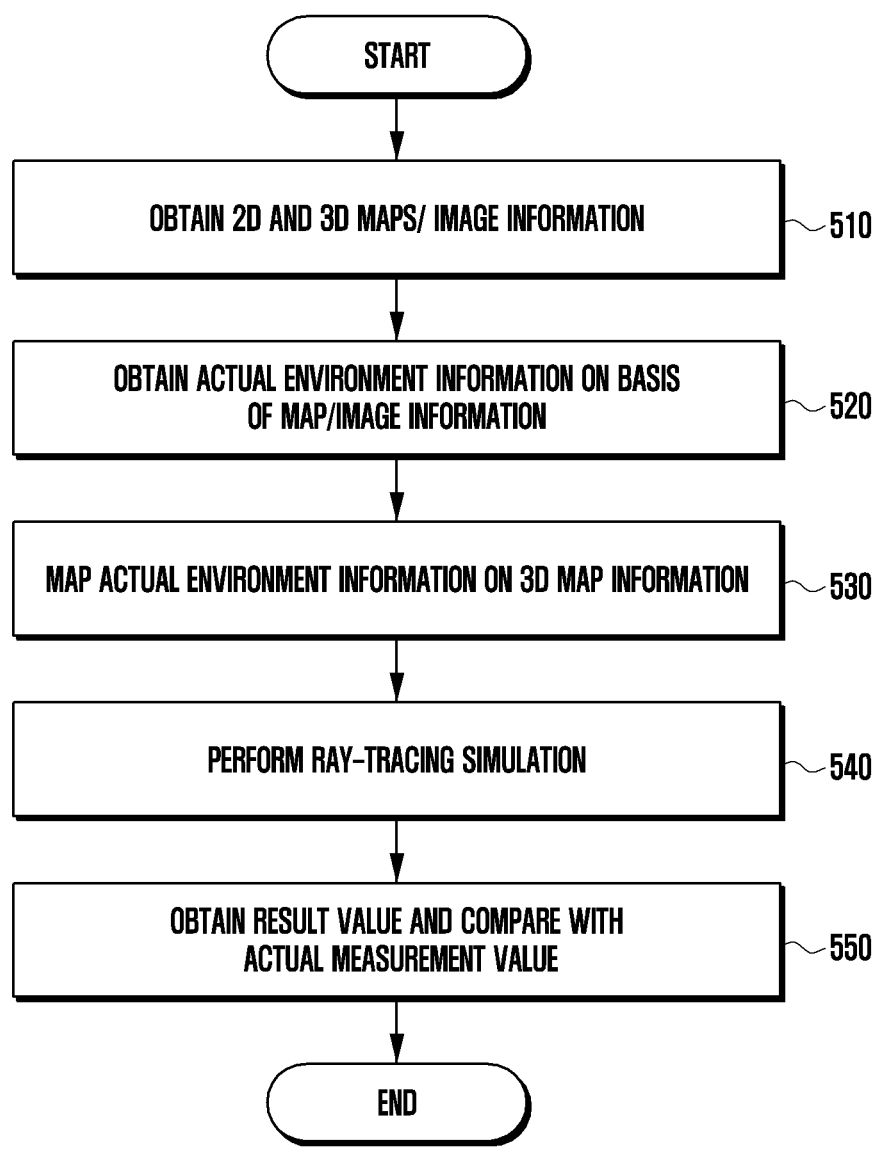
FIG. 5 is a view for explaining a method for analyzing a communication channel environment via ray tracing according to an embodiment of the disclosure.

FIG. 5 is a view for explaining a method for analyzing a communication channel environment via ray tracing according to an embodiment of the disclosure.

Referring to FIG. 5, a method for performing ray-tracing simulation is disclosed. In an embodiment, ray-tracing simulation may be performed in a computing device including a controller. The computing device may be a computing device including a central control processor, and may include a personal computer, a workstation, and the like. In the following embodiment, simulation may be assumed to be performed by a computing device.

In operation 510, the computing device may obtain two dimensional (2D) image information and 3D map information. In an embodiment, the 2D image information may include additional information corresponding to the image, and the additional information may include information about the location at which the image was taken, direction information, and shooting information including an angle of view. The 3D map information corresponding to the 2D image information may be determined based on the additional information. Also, the 3D map information may include location information and 3D map information corresponding thereto. Such information may include information on the shapes of buildings, structures, and plants on the surface or the water surface, and may include information related to at least one of a transmitter candidate location and a receiver candidate location according to an embodiment.

In operation 520, the computing device may obtain information about the actual environment, based on at least one of map information and image information. The information about the actual environment may include information about an object located on a communication path and the characteristics of the object. More specifically, by analyzing the 2D image information, the characteristics of the objects that may be located on the communication path can be determined based on the analysis. The characteristics of the objects may include at least one of the material of the object surface and the external shape of the object, and in the case of an object capable of transmitting radio waves, may include information related to the shape of the object and the degree of signal attenuation during transmission.

In operation 530, the computing device may map the actual environment information on the communication path to the 3D map information, based on the information obtained in steps 510 and 520. As described above, when mapping to 3D map information, additional information obtained through the 2D image information may be mapped to an object corresponding to 3D map information, based on additional information included in the 2D image information.

In operation 540, the computing device may perform a ray-tracing simulation, based on the information generated through operation 530. In an embodiment, the ray-tracing simulation may sequentially perform a ray-tracing simulation corresponding to the beam information while changing the beam information in consideration of a beam in a specific direction, or may perform a ray-tracing simulation corresponding to the assumption that beams in all directions that can be transmitted from the transmitter are transmitted within the same time period. As a result of performing the ray-tracing simulation, it is possible to predict and analyze the signal quality that can be received at the receiver by taking into consideration the path along which the signal transmitted from the transmitter passes to be received by the receiver and the information about the actual environment along the path. Also, in an embodiment, when performing the ray-tracing simulation, at least one of a transmission location and a reception location may be determined based on 3D map information, and a signal transmission environment may be determined based on the information mapped in step 530.

In operation 550, a result value may be obtained based on the ray-tracing simulation, and additional ray-tracing simulation may be performed based on the obtained result value and a value measured in the actual environment. More specifically, when the simulation result value is compared with the real environment measurement value and the compared values are different, the simulation result value may be regenerated by changing the information obtained in operation 520, based on the actual environment measurement value. As such, ray-tracing simulation is performed by reflecting the information about the actual environment on the 3D map, thereby enabling more reliable communication channel analysis. More specifically, the transmitter and receiver can be installed directly in the area targeted for ray-tracing simulation, and basic information for performing ray-tracing simulation can be added or updated based on the result value of the signal transmitted from the transmitter.

As described above, based on the ray-tracing simulation result, at least one of an optimal transmitter location and a receiver location for providing wireless service to a specific area in the map may be determined. In this way, effective network design can be performed by determining at least one of an optimal transmitter position and a receiver position. More specifically, it is possible to determine an optimal base station location at which to effectively provide a radio signal to a wireless terminal in a specific area. By determining the optimal base station position in this way, it is possible to provide effective service even when fewer base stations are provided.

In addition, adaptive network management may be possible by reflecting signal reception information measured in the actual environment. More specifically, after installing the transmitter, if the surrounding environment changes, additional ray-tracing simulation may be performed in consideration of the changed environment, and network management such as adjusting the transmitter position by additionally reflecting the result value may be performed. In addition, such network management may include changing beam-related information transmitted from the transmitter in addition to adjusting the transmitter location. More specifically, the transmitter may determine the transmission beam and the reception beam based on the ray-tracing simulation result values. In order to determine the transmission beam and the reception beam, beam alignment may be performed based on the result value of the ray-tracing simulation. Such adaptive network management may be performed periodically.

FIG. 6 is a view for explaining the effect of a movable object on the radio signal transmission and the resulting signal loss according to an embodiment of the disclosure.

Referring to FIG. 6, a road 630 and a sidewalk 640 may be located on a path along which the radio signal transmitted from a transmitter 610 is transmitted to a reception location 640. In this case, a movable object such as a vehicle 635 or a pedestrian 645 may be located in the transmission path of the radio signal, and thus signal loss may occur. At this time, as the frequency of the radio signal transmitted from the transmitter 610 increases, the signal loss may increase depending on the kind of object, so it may be necessary to determine the signal transmission environment in consideration thereof.

In an embodiment, in the case of the road 630 and the sidewalk 640, such a moving object may be frequently present, and thus, in fact, there is the need to consider the characteristics of an object moving on areas such as the road 630 and the sidewalk 640 in order to determine the signal transmission environment between the transmitter 610 and the receiving position 640.

In the case of the graph 650 below, it shows the loss of a signal transmitted from the transmitter 610 to the receiving position 640 when an object passes over time. In an embodiment, in the case of a section 655 the object passes, the signal loss may increase, and when a large object passes, a larger signal loss may occur.

At this time, it is necessary to identify the characteristics of the movable object that may be located in a specific area on the radio signal transmission path. More specifically, it is possible to determine the area where the object may be located on a transmission path and to model a radio signal transmission environment in consideration of the size, frequency, speed, movement pattern, and material of the object passing through the area.

Figure 7:
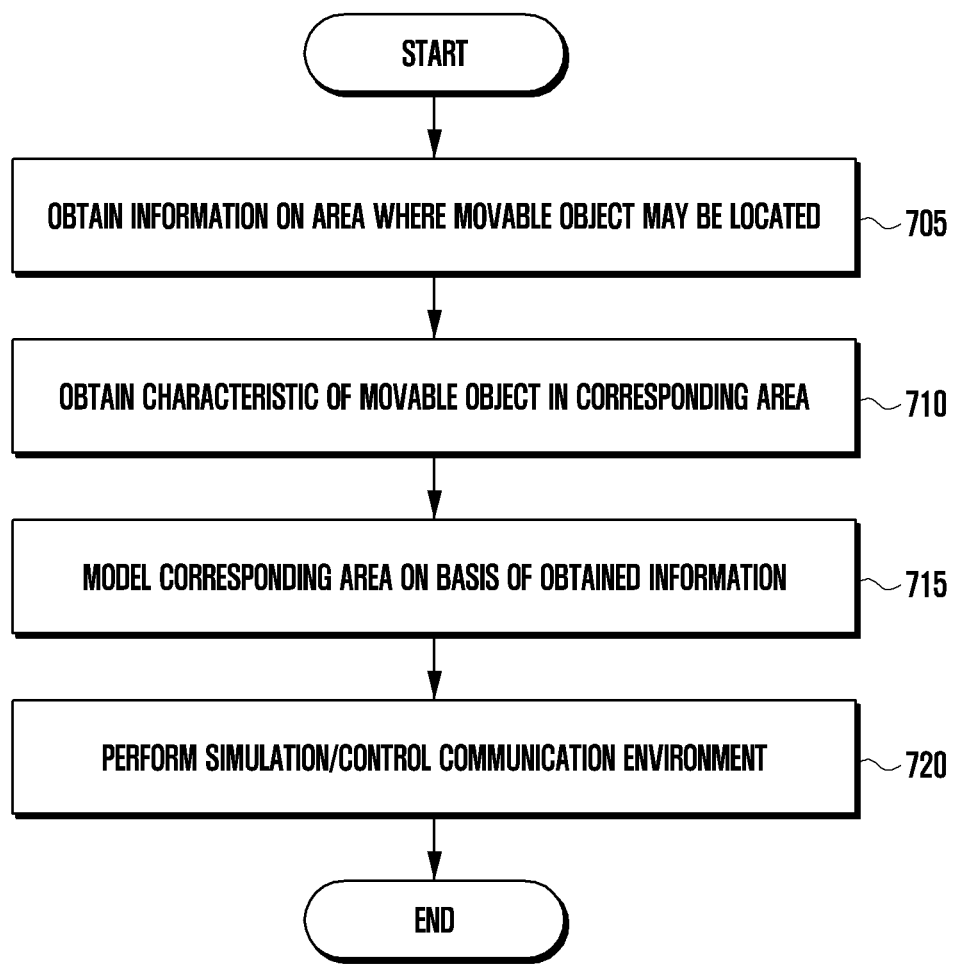
FIG. 7 is a view for explaining a method for performing a radio signal transmission simulation in consideration of a movable object according to an embodiment of the disclosure.

FIG. 7 is a view for explaining a method for performing a radio signal transmission simulation in consideration of a movable object according to an embodiment of the disclosure.

Referring to FIG. 7, a computing device may acquire information related to signal transmission and perform simulation, based thereon, and when a transmission device is installed in the future, the communication system may be controlled based on the simulation result.

In operation 705, the computing device may determine the location of the transmitter and the location of the receiver, and may obtain information about a region in which a movable object located on a path through which a signal can be transmitted may be located. Such information can be obtained through an external database or user input and can also be obtained based on map information, and the area in which a movable object may be located can be identified based on images such as satellite photos and street views. In the case in which the area where the movable object is located is determined based on the image information as described above, the area where the movable object is located may be identified via an image analysis method that uses machine learning.

In operation 710, the computing device may identify the characteristics of an object that is movable in the corresponding area. More specifically, it is possible to identify at least one of size information of moving objects, frequency information of the moving objects, speed information of the moving objects, moving pattern information when periodically moving, and material information of the moving objects. In addition, it is possible to identify information about the characteristics of the movable objects that may affect radio signal transmission. Such information can also be obtained via user input, external databases, and image or video analysis. More specifically, the characteristics of the movable object in the corresponding area may be identified over time, and the characteristics may be obtained based thereon.

In operation 715, the computing device may model an environment in which signals are transmitted from the transmitter to the receiver, based on the obtained information. At this time, in the case of a region where a movable object may be located, modeling may be performed assuming that an object having a physical amount determined based on information obtained in the corresponding region is located. Such a physical amount can be determined based on the characteristics of the movable object, that can be located in three dimensions, and it may be determined that a plurality of objects having different physical amount is present according to the characteristics of the movable object in one region. For example, in the case of a road travelled by vehicles, modeling may be performed when an object having a specific physical value is located in an area occupied by a moving vehicle, based on the average size of the passing vehicle. The larger the average size of the vehicle, the larger the size of the object, and if the vehicle moves more frequently, the modeled signal loss may have a large physical value.

Based on the information modeled in operation 720, a simulation related to radio signal transmission may be performed. Based on the simulation result, the computing device may more accurately analyze a radio signal transmission pattern in consideration of a movable object. In addition, based on the simulation result, when a communication system is operated in the future, the transmitter may transmit a signal, based on the simulation result.

Figure 8:
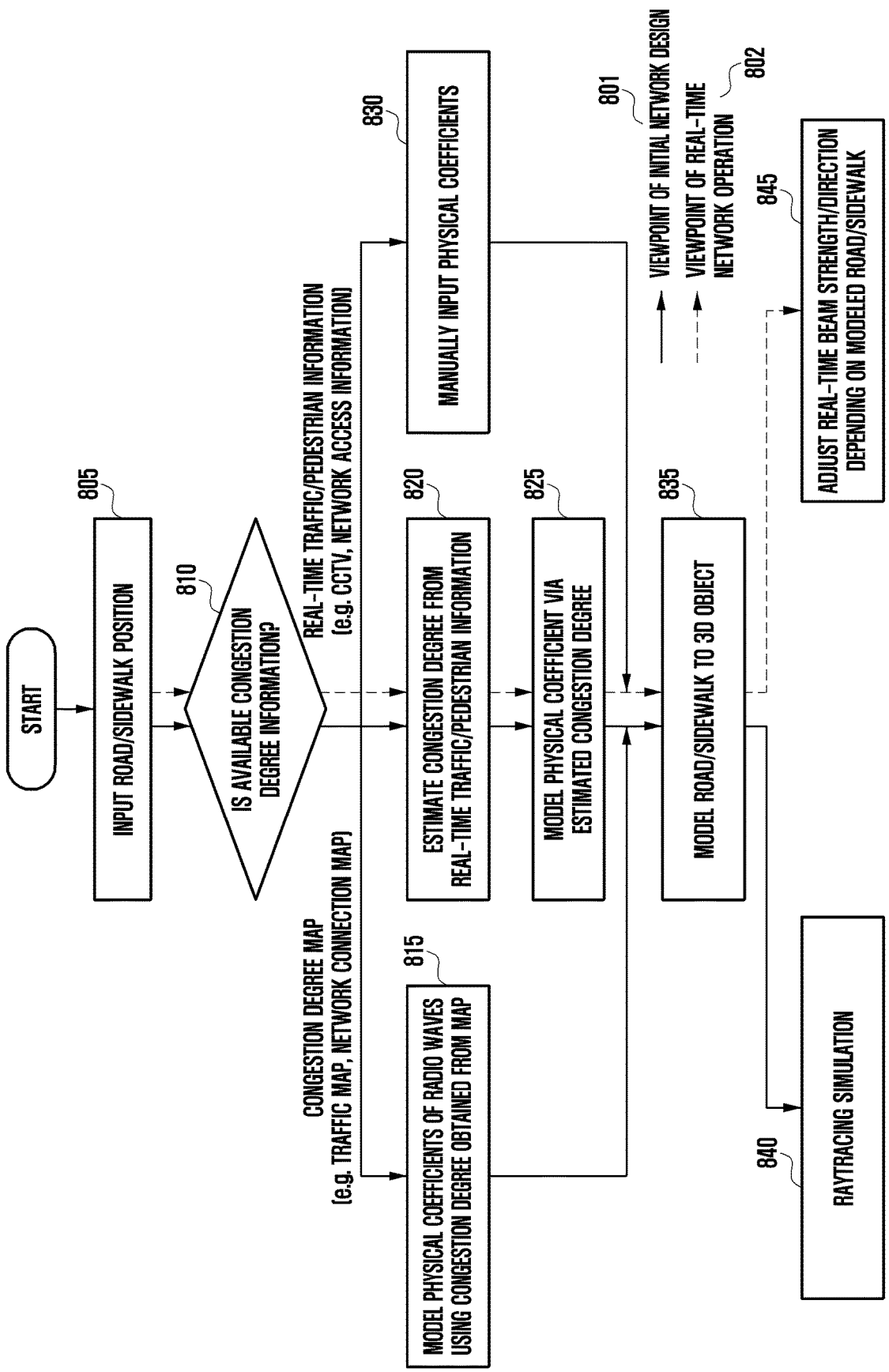
FIG. 8 is a view for explaining a method of performing modeling and simulation in consideration of congestion information according to an embodiment of the disclosure.

FIG. 8 is a view for explaining a method of performing modeling and simulation in consideration of congestion information according to an embodiment of the disclosure.

Referring to FIG. 8, the computing device may perform modeling on the area where the movable object is located, based on the congestion information, and, based thereon, may perform ray tracing to analyze the radio signal propagation pattern or network operation by adjusting the beam intensity and direction. In an embodiment, the computing device performing the simulation and the computing device performing network operations may be the same computing device or different computing devices.

In operation 805, the computing device may identify an area where the movable object can be located. More specifically, it is possible to identify information about an area in which a movable object can be located, such as a road or a sidewalk, and such information can be identified by analyzing user input or image information. More specifically, it is possible to identify the location, size, etc. of an area where a movable object can be located, such as a road or a sidewalk, based on the image information corresponding to the map information.

In operation 810, the computing device may identify the available congestion information. More specifically, it is possible to identify the congestion information that can be used in the identified area. Such congestion information may be identified via separate data, or may be connected to another system or server to receive data related thereto.

If the available congestion information is a congestion map, in operation 815, the computing device may model a physical coefficient related to radio signal propagation, based on the congestion-related information obtained from the congestion map. In an embodiment, such a congestion map may be a map indicating a change in traffic volume, and may include a map indicating a change in the number of users accessing a cellular network in a region. At this time, the information related to the size of the moving object can be analyzed via the image information above, and when a moving speed faster than normal walking speed is detected, it may be assumed to be a vehicle that is moving, and the physical coefficient modeling may be performed based thereon.

If the available information is real-time traffic/pedestrian information, in operation 820, the computing device may estimate the congestion degree, based on the information. More specifically, such information may include at least one piece of image information obtained through a closed circuit television (CCTV) and network access information. When the image information is obtained through a CCTV, the computing device may estimate the congestion degree and the change in time, based on the image information. In addition, in the case of network access information, the congestion degree may be estimated based on information related to the number of network accesses and speed information of a user accessing the network.

In operation 825, the computing device may perform physical coefficient modeling, based on the predicted congestion.

If no congestion information is available, physical coefficient modeling may be performed according to a user input as in operation 830. Performing physical coefficient modeling according to the user input may include modeling the entire area in which the movable object is located with the same physical coefficient. At this time, the same physical coefficient may include determining a physical coefficient as an average value, based on measurement information for a plurality of areas.

In operation 835, the computing device may model the road/walkway as a 3D object, based on the information. When modeling, it is possible to determine the size of the area and the physical coefficients related to radio wave transmission, based on the information obtained above.

In operation 840, the computing device may perform ray tracing to analyze the radio signal propagation pattern, based on the modeled information.

In operation 845, the computing device may vary the network operation according to the modeled road/walkway. More specifically, in an embodiment, it may be performed by a computing device included in a base station that is such a network operation. At this time, if there are many movable objects in the area, based on real-time traffic/pedestrian information, it can be expected that the state of the radio channel in the area is not good, and may adjust beam intensity, direction, etc. based thereon. In addition, when reporting a channel of the terminal, it may be configured to report at least one of precoding matrix information and channel quality information for a wider area. Such a configuration may be configured as a higher-layer signal such as RRC.

In an embodiment, the congestion degree may include information on the number of movable objects that have passed on the road/walkway per unit time.

Figure 9:
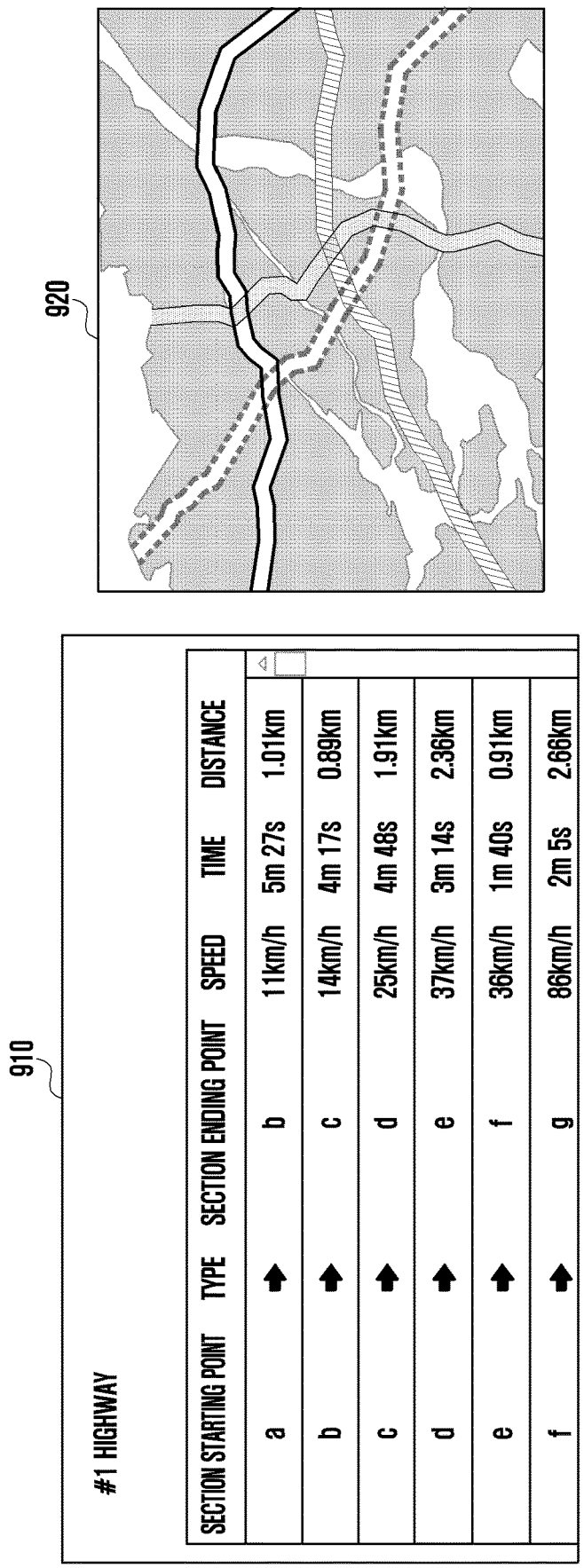
FIG. 9 is a view for explaining a method for obtaining movable object information in consideration of traffic information according to an embodiment of the disclosure.

FIG. 9 is a view for explaining a method for obtaining movable object information in consideration of traffic information according to an embodiment of the disclosure.

Referring to FIG. 9, an example of a congestion map according to traffic information is illustrated. More specifically, road information may be identified on the map 920. Such road information may be identified based on information additionally included in the map information, or may be identified based on separate image information. In this road information, the current average speed, the corresponding speed, and the required time distance may be displayed for each section, and accordingly, the density of the movable object in the corresponding area may be identified. As described above, a 3D object for analyzing a radio signal propagation pattern in a corresponding area may be modeled in consideration of the density and speed of a movable object.

In an embodiment, the radio signal propagation pattern may be analyzed, or network operation may be performed, based on the modeling results. When performing modeling, it is possible to model physical coefficients related to radio signal propagation in the area. When operating the network at the base station, it is possible to adjust the beam information in real time using the congestion information or to set channel-related information reported to the terminal.

Figure 10:
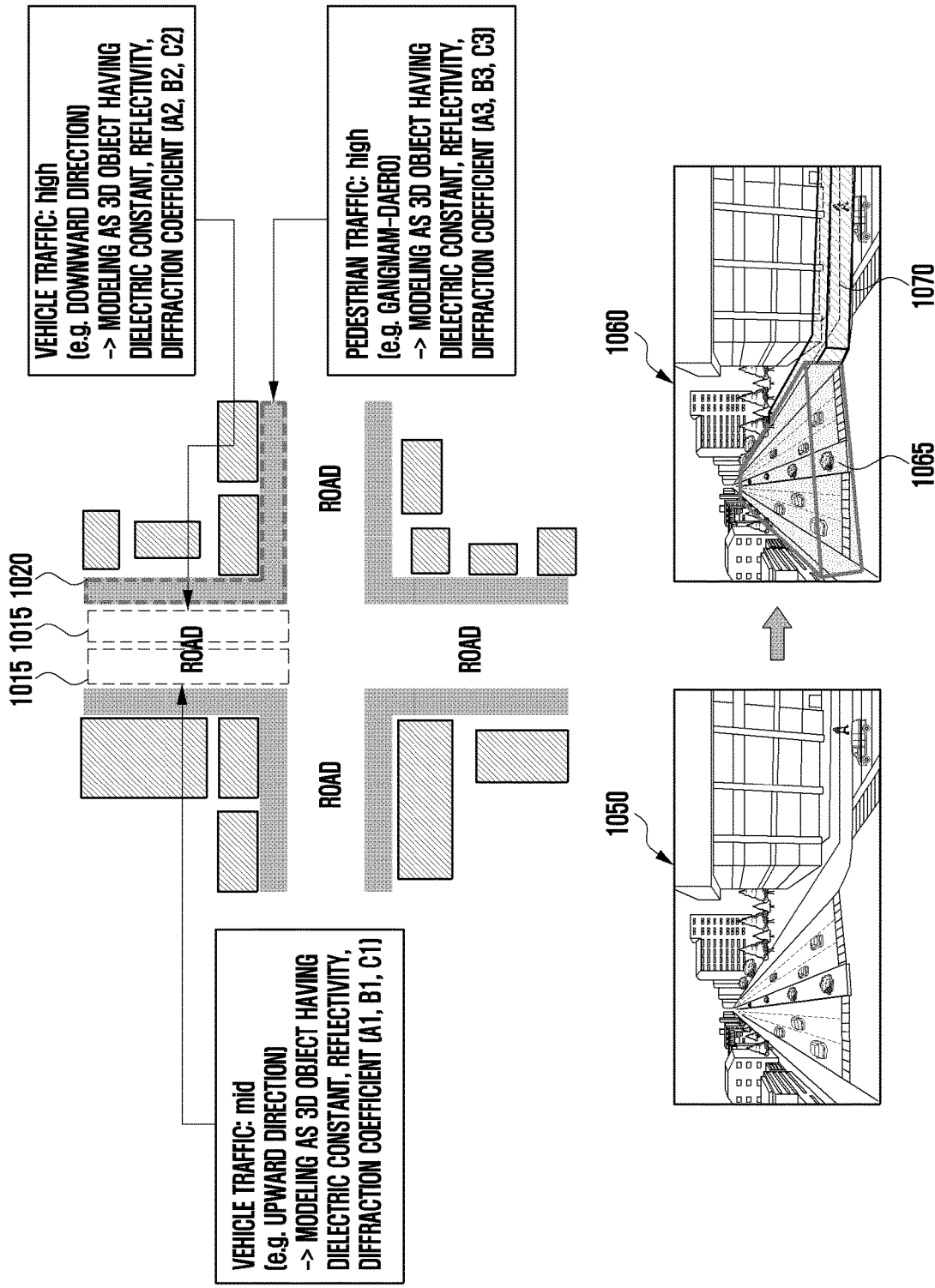
FIG. 10 is a view for explaining a method of determining a movable area on a road and a sidewalk and modeling a physical coefficient based on congestion information in the corresponding area according to an embodiment of the disclosure.

FIG. 10 is a view for explaining a method of determining a movable area on a road and a sidewalk and modeling a physical coefficient based on congestion information in the corresponding area according to an embodiment of the disclosure.

Referring to FIG. 10, roads and sidewalks may be located in the corresponding map area. In an embodiment, a method of performing modeling for analyzing a radio signal propagation pattern, based on a road 1015 and a sidewalk 1020 is illustrated.

A radio signal propagation pattern may be modeled based on information of a movable object on the road 1015 and the sidewalk 1020, among the roads and sidewalks of the embodiment. Further, the information of the movable object may be obtained based on the information described in the previous embodiment.

In the case of the road 1015, the characteristics of vehicle traffic may vary depending on the traffic direction. More specifically, it is possible to determine the characteristics of the vehicle traffic based on the moving direction. In addition, the size of a 3D object may be determined mainly based on the average size of a moving vehicle, but the disclosure is not limited thereto. In an embodiment, a physical quantity may be determined based on the moving characteristics of the vehicle on the road 1015 in the upward direction. More specifically, at least one of the dielectric constant, reflectivity and diffraction coefficient in the upward direction may be determined as a1, b1, and c1, respectively, and, based on the above information, it may be modeled that a 3D object made of a material determined based on the dielectric constant, reflectivity and diffraction coefficient is located, with a size determined based on the size of a vehicle passing on the road in the upward direction of the road 1015. Similarly, at least one of the dielectric constant, reflectivity and diffraction coefficient in the downward direction may be determined as a2, b2, and c2, respectively, and, based on the above information, it may be modeled as a 3D object made of a material determined based on the dielectric constant, reflectivity and diffraction coefficient is located, with a size determined based on the size of a vehicle passing on the road in the downward direction of the road 1015. In an embodiment, transmittance may be further considered for the modeling.

Also, in an embodiment, it may be determined that a corresponding object is located on the sidewalk 1020, based on the characteristics of the pedestrian where the pedestrian may be located. More specifically, the corresponding physical quantity may be determined on the sidewalk 1020, based on the movement characteristics of the pedestrian. More specifically, on the sidewalk 1020, at least one of the dielectric constant, reflectivity, and diffraction coefficient may be determined as a3, b3, and c3, respectively, based on the movement characteristics of the passing object, and, based on the above information, it may be modeled as a 3D object made of a material determined based on the dielectric constant, reflectivity and diffraction coefficient, with a size determined based on the average size of a pedestrian passing on the sidewalk 1020.

Such results can be explained in more detail in connection with reference numerals 1050 and 1060. More specifically, based on the movement characteristics of vehicles and pedestrians on reference numeral 1050, in the case of a road, an object such as reference numeral 1065 may be modeled as being placed, and in the case of a sidewalk, an object of reference numeral 1070 may be modeled as being placed. In the case of reference numeral 1065, it may be modeled as an object having different materials and sizes according to each passage direction.

As described above, the propagation characteristics of the radio signal can be more accurately analyzed by assuming that a 3D object having a specific physical quantity is placed in the corresponding region and by modeling the propagation characteristics of the radio signal, based on the characteristics, rather than considering movable objects one by one.

Figure 11:
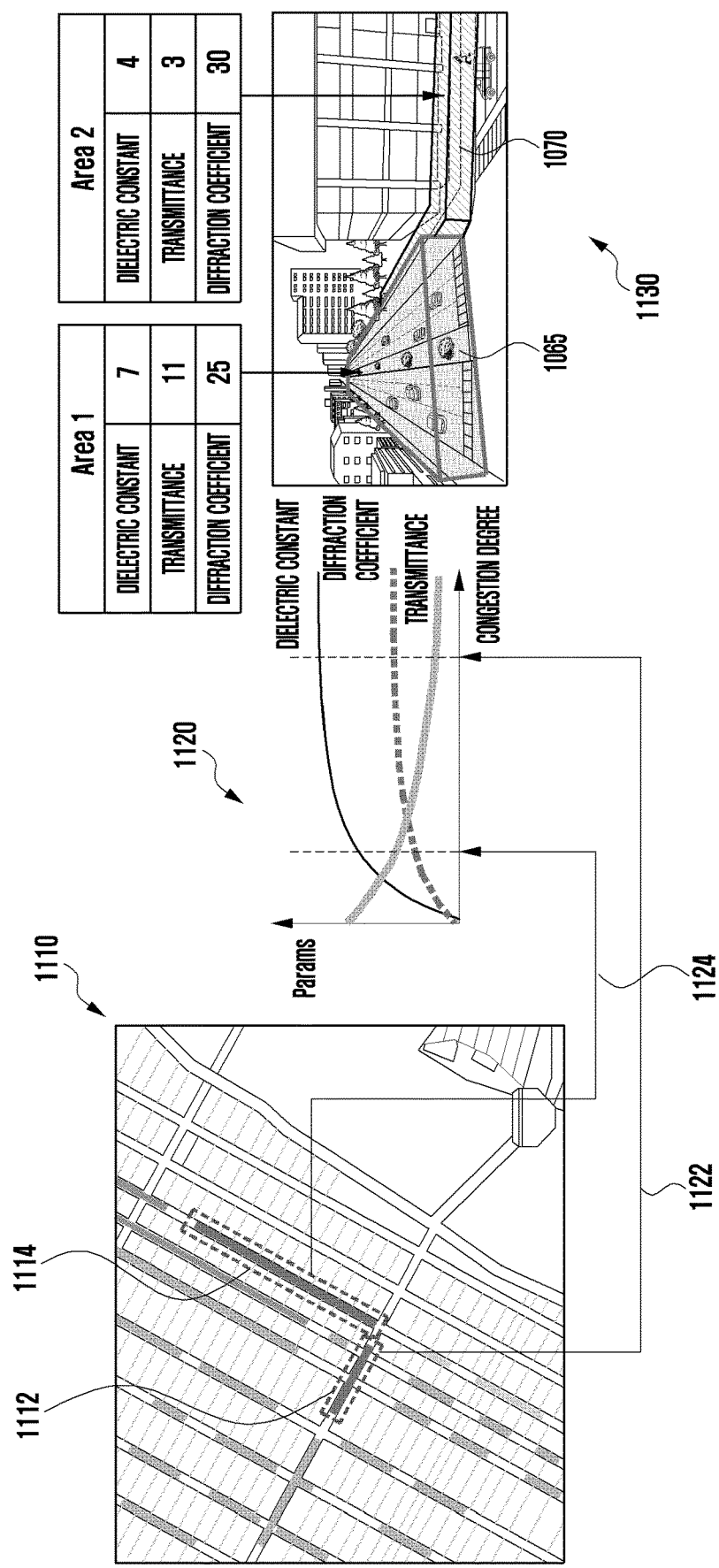
FIG. 11 is a view for explaining a method for performing mapping on map information in consideration of a movable area and congestion of an object and analyzing a signal transmission/reception environment based on the mapping according to an embodiment of the disclosure.

FIG. 11 is a view for explaining a method for performing mapping on map information in consideration of a movable area and congestion of an object and analyzing a signal transmission/reception environment based on the mapping according to an embodiment of the disclosure.

In an embodiment, at least one road or sidewalk may be identified on a map. In an embodiment, a first road 1112 and a second road 1114 may be identified. In addition, it is possible to identify the congestion degree of the corresponding road, based on at least one of the embodiments of the disclosure.

In this embodiment, as indicated by reference numeral 1120, at least one change pattern among the dielectric constant, diffraction coefficient, and transmittance according to congestion degree may be identified. Such a change pattern may be identified based on a plurality of measurement results. In embodiments, the dielectric constant and the diffraction coefficient increase as the congestion degree increases, and the transmittance decreases as the congestion degree increases.

In an embodiment, at least one of permittivity, diffraction coefficient, and transmittance may be mapped based on the congestion of the corresponding road by mapping to reference numeral 1120, or more precisely reference numerals 1122 and 1124, based on the congestion value of each road 1112 and 1114. In an embodiment, the relationship between the dielectric constant, diffraction coefficient, and transmittance according to congestion may vary according to the characteristics of an object moving in the corresponding area. For example, roads on which vehicles travel and sidewalks through which pedestrians pass may have a relationship between permittivity, diffraction coefficient, and transmittance according to different congestion degree.

As shown in reference numeral 1130, the dielectric constant, diffraction coefficient, and transmittance of the corresponding area may be identified based on the congestion degree of roads and sidewalks, and, based thereon, a radio wave propagation pattern may be determined.

Figure 12:
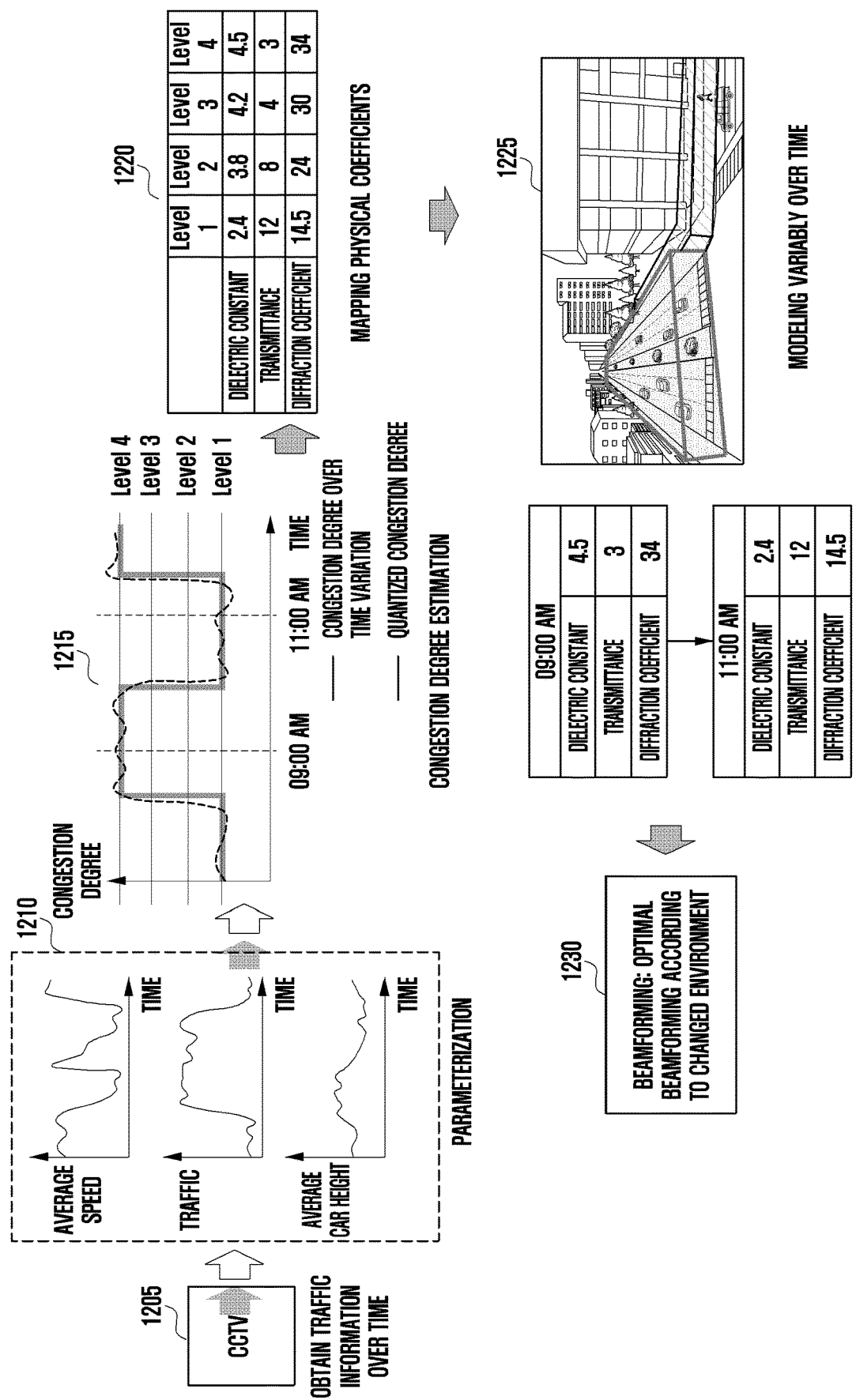
FIG. 12 is a view for explaining a method for applying a congestion degree of a movable object over time according to an embodiment of the disclosure.

FIG. 12 is a view for explaining a method for applying a congestion degree of a movable object over time according to an embodiment of the disclosure.

Referring to FIG. 12, taking a vehicle as an example, an average speed, traffic volume, and time change of the size of a passing vehicle may be identified, and, based thereon, an environment changed according to time may be identified, and a network may be operated according to the changed environment. Although beamforming is described as an example in the embodiment, it is possible to perform a network operation based thereon considering that objects of different materials and sizes are located in the corresponding area at different times.

At reference numeral 1205, traffic information over time may be identified from a device or database capable of obtaining image information over time on a specific road, such as CCTV.

Based on this, as shown in reference numeral 1210, it is possible to identify the change in the average speed, the amount of traffic, and the size of the passing vehicle. The congestion degree may be identified based on at least one of the average speed, the amount of traffic, and the time change of the size of a vehicle passing through. The lower the average speed, the greater the congestion degree, the greater the amount of traffic, the greater the congestion degree, and the larger the average vehicle size, the greater the congestion degree. In addition, the average vehicle size may be used as information for determining the size of an object assumed to be located in the corresponding area.

As shown by reference numeral 1215, the congestion degree may be determined based on the identified information according to time, and the congestion degree may be quantized according to an embodiment. According to the embodiment, different congestion degree values may be applied for each time, based on the time variation of the congestion degree without quantization, but the amount of computation may be reduced by quantizing the congestion degree.

As shown by reference numeral 1220, it is possible to determine at least one of the dielectric constant, transmittance, and diffraction coefficient, based on the quantized congestion degree. This may determine a physical coefficient corresponding to each congestion degree, based on a plurality of measurement results, and may determine a physical coefficient corresponding to the material of an object assumed to be located in a corresponding area, based on the determined congestion degree.

As shown by reference numeral 1225, it is possible to map the corresponding physical coefficient even though it is variable over time.

As shown by reference numeral 1230, the network operation may be performed based on variably mapped physical coefficients. More specifically, the network operation may be performed based on the change by referring to the physical coefficient value according to the congestion degree of the corresponding region, which may include different beamforming methods.

FIG. 13 is a view for explaining a method for determining a propagation characteristic of a signal, based on the congestion degree of each movable object according to an embodiment of the disclosure.

Referring to FIG. 13, a method of differently using a signal transmission method of a base station, based on a congestion degree of a road is illustrated.

Transmitters 1305 and 1355 may transmit signals to receiving locations 1315 and 1365. At this time, a signal may be transmitted in consideration of a transmission path, based on the congestion degree of the roads 1320 and 1370. More specifically, when the road is congested, a signal may be transmitted considering the path closest to the straight-line distance. As an example, a beamforming factor may be determined to facilitate signal transmission in a corresponding direction. When the road is not congested, signal transmission may be performed in consideration of a direct path and a path due to reflection. As described above, spatial multiplexing can be performed more efficiently by changing the network operation method, based on the congestion degree of the road.

Figure 14:
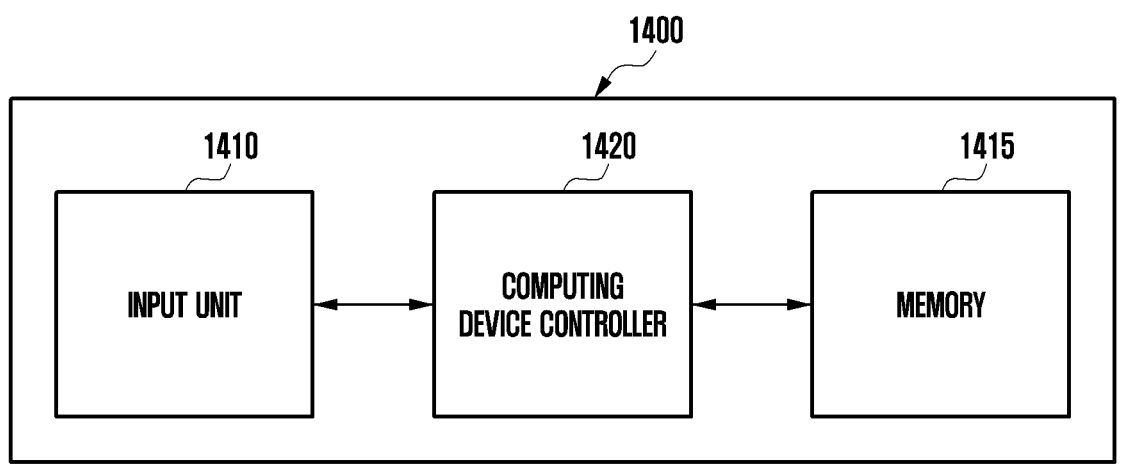
FIG. 14 is a view for explaining a computing device according to an embodiment of the disclosure.

FIG. 14 is a view for explaining a computing device according to an embodiment of the disclosure.

FIG. 14 is a view illustrating a computing device according to an embodiment of the disclosure.

Referring to FIG. 14, the computing device 1400 of the embodiment includes an input unit 1410, a memory 1415 and a controller 1420.

The transmitter 1410 may transmit/receive a signal with a device outside the computing device 1400. More specifically, data may be transmitted/received with an external device, and an interface unit for that purpose may be included.

The memory 1415 may store at least one of information related to the computing device 1400 and information transmitted/received through the transceiver 1410. In addition, the memory 1415 may store general information necessary for simulation in the embodiment of the disclosure, such as information on object surface materials and external shapes according to image analysis, 3D map information, and information on object surface materials and external shapes mapped thereto. Also, according to an embodiment, the memory 1415 may store information related to a moving object and a moving characteristic of the object in a region where the movable object can be located. In addition, information stored in the memory 1415 may be added, deleted, and updated based on at least one of a simulation result and a comparison result.

The controller 1420 may control the operation of the computing device 1400, and may perform overall control of the computing device to perform operations related to the operation device described in the above embodiment. The controller 1420 may include at least one processor. Also, the processor may be controlled by a program including an instruction for executing the method described in the embodiment of the disclosure. In addition, the program may be stored in a storage medium, and the storage medium may include volatile or nonvolatile memory. The memory may be a medium capable of storing data, and as long as the instruction can be stored, there is no limitation as to the form thereof.

Figure 15:
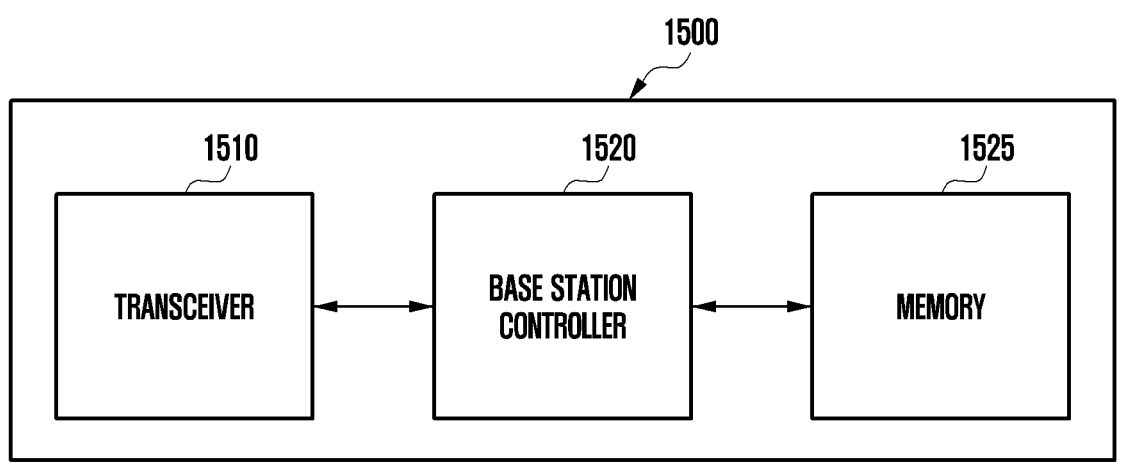
FIG. 15 is a view for explaining a base station according to an embodiment of the disclosure.

FIG. 15 is a view for explaining a base station according to an embodiment of the disclosure.

Referring to FIG. 15, the base station 1500 of the embodiment includes a transceiver 1510, a memory 1515 and a controller 1520.

The transceiver 1510 may transmit/receive signals with a terminal and other network entities.

The memory 1515 may store at least one of information related to the base station 1500 and information transmitted and received through the transceiver 1510. In addition, as a result of the simulation according to the embodiment, it is possible to store information related to the congestion degree over time in an area in which a movable object can be located and a corresponding area. In an embodiment, the configuration of the memory 1515 may not be necessary.

The controller 1520 may control the operation of the base station 1500 and may control the entire base station to perform operations related to the base station described in the above embodiment. The controller 1520 may include at least one processor.

Although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be achieved on the basis of the technical idea of the disclosure.

The invention claimed is:

1. A method performed by a device in a communication system, the method comprising:

identifying a first position of a transmitter and a second position of a receiver;
identifying an area in which a moving object is located between the first position and the second position based on image information;
identifying a characteristic of the moving object associated with signal loss in the area; and
identifying a propagation characteristic of a signal transmitted between the first position and the second position based on the characteristic of the moving object,
wherein the characteristic of the moving object is associated with at least one of a size, a material, or a moving pattern of the moving object.

2. The method of claim 1, further comprising:
identifying a three-dimensional object associated with the signal loss according to the characteristic of the moving object; and
identifying the propagation characteristic of the signal transmitted between the first position and the second position based on the three-dimensional object.

3. The method of claim 1, wherein the characteristic of the moving object is associated with at least one of a speed of the moving object and a number of objects that have passed on the area per unit time.

4. The method of claim 1,
wherein the characteristic of the moving object is identified based on image information associated with the area, and
wherein the characteristic of the moving object is identified based on congestion information associated with the moving object.

5. The method of claim 1, further comprising identifying at least one of permittivity, reflectivity, transmittance, or a diffraction coefficient associated with transmission of the signal in the area, based on the characteristic of the moving object.

6. The method of claim 1, wherein identifying the propagation characteristic comprises:
modelling a communication environment in which the signal is transmitted between the first position and the second position; and
performing a simulation associated with signal transmission based on the modelled communication environment.

7. The method of claim 6,
wherein a signal transmitted by the transmitter is based on a result of the simulation,
wherein channel information reported by the receiver is determined based on the modelled communication environment, and
wherein the channel information includes at least one of information on a precoding matrix or information on a channel quality.

8. A device in a communication system, the device comprising:
a transceiver; and
a controller coupled with the transceiver and configured to:
identify a first position of a transmitter and a second position of a receiver,
identify an area in which a moving object is located between the first position and the second position based on image information,
identify a characteristic of the moving object associated with signal loss in the area, and
identify a propagation characteristic of a signal transmitted between the first position and the second position based on the characteristic of the moving object,
wherein the characteristic of the moving object is associated with at least one of a size, a material, or a moving pattern of the moving object.

9. The device of claim 8,
wherein the controller is further configured to:
identify a three-dimensional object associated with the signal loss according to the characteristic of the moving object, and
identify the propagation characteristic of the signal transmitted between the first position and the second position based on the three-dimensional object.

10. The device of claim 8, wherein the characteristic of the moving object is associated with at least one of a speed of the moving object and a number of objects that have passed on the area per unit time.

11. The device of claim 8,
wherein the characteristic of the moving object is identified based on image information associated with the area, and
wherein the characteristic of the moving object is identified based on congestion information associated with the moving object.

12. The device of claim 8, wherein the controller is further configured to:
identify at least one of permittivity, reflectivity, transmittance, or a diffraction coefficient associated with transmission of the signal in the area based on the characteristic of the moving object.

13. The device of claim 8,
wherein the controller is configured to:
model a communication environment in which the signal is transmitted between the first position and the second position, and
perform a simulation associated with signal transmission based on the modelled communication environment.

14. The device of claim 13,
wherein a signal transmitted by the transmitter is based on a result of the simulation,
wherein channel information reported by the receiver is determined based on the modelled communication environment, and
wherein the channel information includes at least one of information on a precoding matrix or information on a channel quality.

* * * * *